US008872469B2

(12) United States Patent  
Joo et al.

(10) Patent No.: US 8,872,469 B2
(45) Date of Patent: Oct. 28, 2014

(54) METHOD AND APPARATUS FOR PROVIDING STANDBY POWER FOR VISUAL DISPLAY DEVICE

(75) Inventors: Sung-yong Joo, Yongin-si (KR); Gil-yong Chang, Suwon-si (KR); Jin-hyung Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 12/711,790

(22) Filed: Feb. 24, 2010

(65) Prior Publication Data

US 2011/0163602 A1 Jul. 7, 2011

(30) Foreign Application Priority Data

Jan. 7, 2010 (KR) ........................ 10-2010-0001416

(51) Int. Cl.
*H01M 6/50* (2006.01)
*G06F 1/26* (2006.01)
*H02J 7/04* (2006.01)
*H02J 7/35* (2006.01)
*H04W 52/02* (2009.01)
*H02J 9/06* (2006.01)

(52) U.S. Cl.
CPC ................ *G06F 1/263* (2013.01); *Y02B 60/50* (2013.01); *H02J 7/045* (2013.01); *H02J 7/35* (2013.01); *H04W 52/0296* (2013.01); *H02J 9/061* (2013.01)
USPC .......................................... 320/101; 320/114

(58) Field of Classification Search
USPC ........................................................ 320/101
See application file for complete search history.

(56) References Cited

U.S. PATENT DOCUMENTS

| 7,224,143 | B2* | 5/2007 | Liscio et al. | 320/114 |
| 7,449,798 | B2* | 11/2008 | Suzuki et al. | 307/65 |
| 2005/0162415 | A1* | 7/2005 | Chen et al. | 345/207 |
| 2007/0171606 | A1* | 7/2007 | Iwai | 361/685 |
| 2008/0094025 | A1* | 4/2008 | Rosenblatt et al. | 320/101 |
| 2008/0216418 | A1* | 9/2008 | Durham | 52/73 |
| 2009/0058353 | A1* | 3/2009 | Jung | 320/101 |

FOREIGN PATENT DOCUMENTS

| CN | 101340471 A | 1/2009 |
| EP | 0 622 883 A2 | 11/1994 |
| EP | 0 967 511 A1 | 12/1999 |
| JP | 2000-134825 A | 5/2000 |
| JP | 2007-151341 A | 6/2007 |
| WO | 2007/100961 A2 | 9/2007 |

OTHER PUBLICATIONS

Communication dated Apr. 16, 2014 issued by the European Patent Office in counterpart European Patent Application No. 10157956.3.

* cited by examiner

*Primary Examiner* — Edward Tso
*Assistant Examiner* — Robert Grant
(74) *Attorney, Agent, or Firm* — Sughrue Mion, PLLC (57) ABSTRACT

Provided are an apparatus and method thereof for providing standby power to a visual display, the apparatus including: a light collection unit which is operable to receive light and output a charging current; a battery which is operable to receive the charging current and providing the standby power to the visual display; and a controller which determines whether the battery has a voltage below a predetermined value, wherein if the voltage is below the predetermined value, the controller controls the battery to receive the charging current from the light collection unit, and wherein if the voltage is not below the predetermined value, the controller controls the battery to provide the standby power to the visual display.

21 Claims, 8 Drawing Sheets

METHOD AND APPARATUS FOR PROVIDING STANDBY POWER FOR VISUAL DISPLAY DEVICE

BACKGROUND OF THE INVENTION

1. Field of the Invention

Apparatuses and methods consistent with the present invention relate to providing standby power for a visual display device.

2. Description of the Related Art

As used herein, the term "display device" is synonymous with "visual display device," and both terms include any type of display device which is capable of operating in a standby mode. Examples include a computer monitor, a television, a handheld device having a display screen, etc.

Many modern display devices are capable of operating in a normal operating mode and a standby mode. The normal mode includes when the display device is being used normally, e.g., to view an image. Power consumption during the normal operating mode is typically high. The standby mode, on the other hand, includes a low power mode which is utilized when the display device is turned off or inactive, but where some small amount of power is supplied to at least some components of the display device so as to provide power for some basic functions which may require power at times even when the display device is off or otherwise inactive.

For example, an internal clock, a remote control input receiving circuit (e.g., an infrared sensor), an input keypad (e.g., power button, etc.), other communication ports (e.g., Ethernet, USB, etc.), and a controller to receive input commands and perform standby mode functions (e.g., such as powering on the visual display device) are all examples of circuit components which may be found within a display device and which may require power at times when the display device is turned off or otherwise inactive. Additionally, a display device may enter into a sleep mode or a power-saving mode, wherein the display screen is blanked or a screen saver is displayed so as to save power.

As used herein, a "standby mode" includes all of the above situations. Also, the term "standby power" includes power which is supplied to and/or consumed by a display device while in standby mode.

However, a drawback exists in the related art whereby even though power consumption may be reduced during standby mode operation, standby power must nevertheless be constantly supplied. As a result, there is a constant cost to pay for the supplied power (e.g., as provided by an electrical power company, etc.). Additionally, the use of power provided by traditional energy sources (e.g., from fossil fuel power plants, etc.) is becoming increasingly disfavored as the use of alternative energy sources is largely consider to be more environmentally friendly, and has recently become more economically viable.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a method for providing standby power to a visual display, wherein the method may include: determining whether a battery has a voltage below a predetermined value; if the voltage is below the predetermined value, charging the battery with a charging current from a light collection unit; and if the voltage is not below the predetermined value, providing the standby power to the visual display with the battery.

The light collection unit may include a first light collector circuit and a second light collector circuit.

The charging current may include one of a first current from the first light collector circuit and a second current from the second light collector circuit.

The first light collector circuit may be external to the visual display and the second light collector circuit may be internal to the visual display, wherein the first light collector circuit may be operable to collect first light, which may be external to the visual display, and output the first current, and wherein the second light collector circuit may be operable to collect second light, which may be internal to the visual display, and output the second current.

The battery may be operable to selectively receiving one of the charging current and a third current from an alternating current (AC) power source.

The method may further include: if both the first current and the second current are below a threshold value, and the voltage is below the predetermined value, charging the battery with the third current from the AC power source.

The method may further include: if both the first current and the second current are below a threshold value, and the voltage is below the predetermined value, charging the battery with a third current from an alternating current (AC) power source.

The method may further include: if both the first current and the second current are below a threshold value, and the voltage is below the predetermined value, providing the standby power to the visual display with an alternating current (AC) power source.

Another aspect of the present invention provides an apparatus for providing standby power to a visual display, wherein the apparatus may include: a light collection unit which is operable to receive light and output a charging current; a battery which is operable to receive the charging current and providing the standby power to the visual display; and a controller which determines whether the battery has a voltage below a predetermined value, wherein if the voltage is below the predetermined value, the controller controls the battery to receive the charging current from the light collection unit, and wherein if the voltage is not below the predetermined value, the controller controls the battery to provide the standby power to the visual display.

The light collection unit may include a first light collector circuit and a second light collector circuit.

The charging current may include one of a first current from the first light collector circuit and a second current from the second light collector circuit.

The first light collector circuit may be external to the visual display and the second light collector circuit may be internal to the visual display, wherein the first light collector circuit may be operable to collect first light, which may be external to the visual display, and output the first current, and wherein the second light collector circuit may be operable to collect second light, which may be internal to the visual display, and output the second current.

The battery may be operable to selectively receiving one of the charging current and a third current from an alternating current (AC) power source.

If both the first current and the second current are below a threshold value, and the voltage is below the predetermined value, the controller may control the battery to receive the third current from the AC power source.

The apparatus may further include an alternating current (AC) power source which outputs a third current, wherein if both the first current and the second current are below a threshold value, and the voltage is below the predetermined value, the controller controls the battery to receive the third current from the AC power source.

The apparatus may further include an alternating current (AC) power source, wherein if both the first current and the second current are below a threshold value, and the voltage is below the predetermined value, the controller controls the AC power source to provide the standby power to the visual display.

Another aspect of the present invention provides a visual display device which may include: a light collection unit which is operable to receive light and output a first charging current; an alternating current (AC) power source which is operable to output a second charging current; a battery which is operable to selectively receive one of the first charging current and the second charging current, and is operable to provide a standby power to the visual display device; and a controller which determines whether the battery has a voltage below a predetermined value, wherein if the voltage is below the predetermined value, the controller controls the battery to selectively receive the one of the first charging current and the second charging current.

The visual display device may further include: a keypad which is operable to receive a keypad input command; and a remote control receiving unit which is operable to receive a remote control input command, wherein the providing of the standby power to the visual display device includes providing an operating power to at least one of the keypad and the remote control receiving unit.

The controller may further determine whether the light is received by the light collection unit, and if the voltage is below the predetermined value and the light is not received by the light collection unit, the controller may control the AC power source to provide the standby power to the visual display device.

The controller may further determine whether the light is received by the light collection unit, and if the voltage is below the predetermined value and the light is not received by the light collection unit, the controller may control the battery to selectively receive the second charging current from the AC power source.

If the voltage is not below the predetermined value, the controller may control the battery to provide the standby power to the visual display.

Another aspect of the present invention provides a method for charging a battery within a visual display having a light collection unit, wherein the method may include: determining whether the battery has a voltage below a predetermined value; determining whether a light source is available to the light collection unit; and if the voltage is below the predetermined value and the light source is available to the light collection unit, charging the battery with the light collection unit.

The light collection unit may include an internal light collector and an external light collector, and the light source may include an internal light source and an external light source.

The method may further include: determining whether the visual display is in a standby mode, wherein if the visual display is in the standby mode, the determining whether the light source is available to the light collection unit includes determining whether the external light source is available to the external light collection unit, and wherein if the visual display is not in the standby mode, the determining whether the light source is available to the light collection unit includes determining whether the internal light source is available to the internal light collection unit.

If the visual display is in the standby mode and the external light source is not available to the external light collection unit, the method may further include charging the battery with an alternating current (AC) power source.

If the visual display is not in the standby mode and the internal light source is not available to the internal light collection unit, the method may further include charging the battery with an alternating current (AC) power source.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
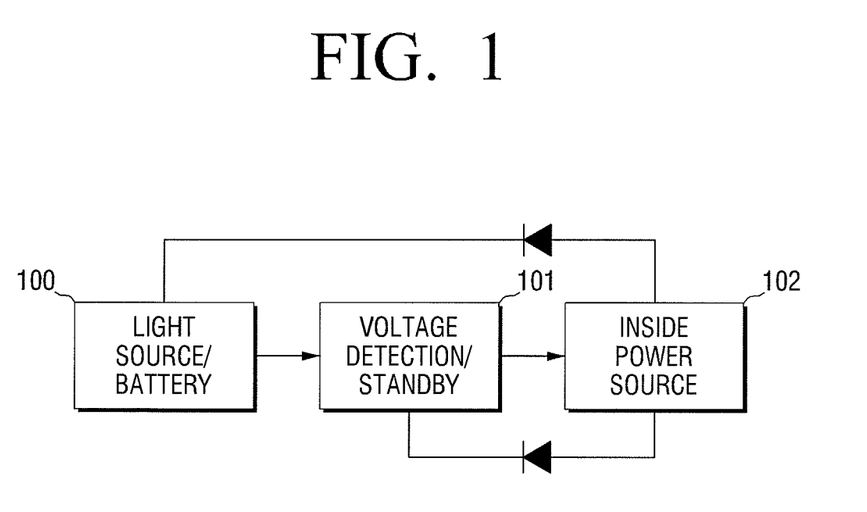
FIG. 1 illustrates an example of an apparatus according to an exemplary embodiment of the present invention.

FIG. 1 shows an example of a basic apparatus according to an exemplary embodiment of the present invention. As shown in FIG. 1, a basic apparatus includes a light power source/battery unit 100, a voltage detection/standby unit 101 and an inside power source unit 102. The voltage detection/standby unit 101 monitors a voltage level of the light power source unit/battery unit 100. If the detected voltage level is less than a predetermined level, the voltage detection/standby unit 101 can control the inside power source 102 to charge a battery (not shown) in the light power source unit 100. Additionally, if the voltage detection/standby unit 101 determines that the voltage level of the battery is less than the predetermined level, the inside power source 102 also provides the standby power to the standby components within the voltage detection/standby unit 101. The inside power source unit 102 can include an alternating current (AC) power source which can be used to provide the standby power to the standby components in the event that the light power source/battery unit 100 is not charged to a predetermined level.

It should be noted that while the above description indicates that the light power source/battery unit 100 includes a battery, this is merely for convenience. One of skill in the art would understand that the battery could equally be within the voltage detection/standby unit 101, within the inside power source unit 102, or for that matter, within its own independent unit. The same is true with regard to the location of the standby components.

Figure 2:
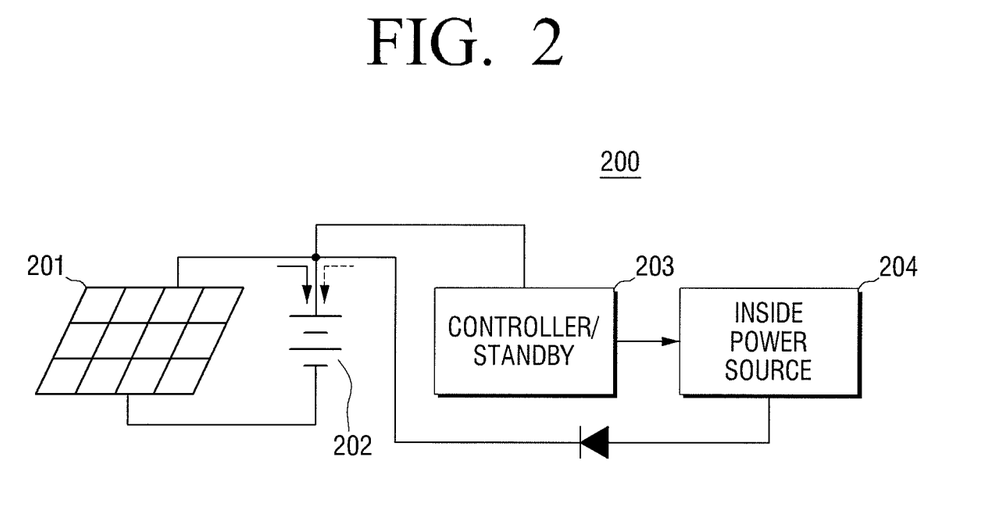
FIG. 2 illustrates an example of an apparatus according to an exemplary embodiment of the present invention.

FIG. 2 shows a different perspective of an apparatus according to an exemplary embodiment of the present invention. As shown in FIG. 2, the apparatus 200 may include a light collector 201. The term "light collector," as used herein refers to a photovoltaic module or a photovoltaic panel, or any similar device which is capable of collecting light and outputting a current. As further shown in FIG. 2, the light collector 201 is connected to a battery 202, and the inside power source 204 is also connected to the battery 202. The controller/standby unit 203 is connected to both the battery 202 and the inside power source 204.

With this configuration, the controller/standby unit 203 can detect the voltage level of the battery 202, and if it is determined that the battery 202 has a voltage level which is greater than or equal to a predetermined threshold, the controller/standby unit 203 can control the inside power source 204 to switch off, and control the battery 202 to supply power to the standby components (not shown) within the controller/standby unit 203. Thus, when the light collector 201 collects light and outputs a current (shown as the solid arrow flowing into the battery 202), the output current can be used to charge the battery 202.

On the other hand, if the controller/standby unit 203 determines that the battery 202 has a voltage level which is less than the predetermined threshold, the controller/standby unit 203 can control the inside power source 204 to switch on and output a current (shown as the dashed arrow flowing into the battery 202) which charges the battery 202, and further control the inside power source 204 to supply power to the standby components.

Figure 3:
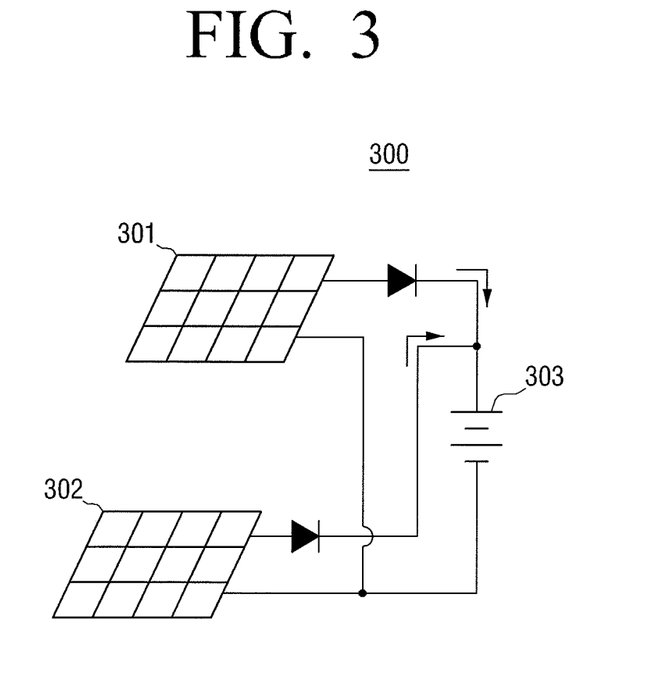
FIG. 3 illustrates an example of an apparatus according to an exemplary embodiment of the present invention.

FIG. 3 shows an example of a light power source unit according to an exemplary embodiment of the present invention. As shown in FIG. 3, the light power source unit 300 can include a plurality of light collectors, e.g., 301 and 302. In this example, the first light collector 301 may be an internal light collector, and the second light collector 302 may be an external light collector. For example, an internal light collector can be installed within the visual display device so as to collect any light which is not otherwise reflected toward the viewer. In such a case, light can be collected while the user uses the visual display device (i.e., while in a normal operating mode as opposed to a standby mode).

By contrast, an external light collector can be installed at some location which is external to the visual display device. For example, the external light collector could be installed on a surface of the visual display device (e.g., a top surface where light might most likely be collected). The location of the external light collector should be at some place where external light, such as sunlight, or ambient room light can be collected. Also, while FIG. 3 only shows a single external light collector, the present invention is not limited to this configuration. Instead, a plurality of external light collectors could be installed at various locations external to the visual display device so as to collect a maximum amount of light from external light sources.

As shown in FIG. 3, light collected by the first and second light collectors 301 and 302 can then be converted into output charging currents (depicted as solid lines pointing into the battery 303), from the respective collectors, to provide a charging current for the battery 303. In this way, the battery 303 can be charged from light collected from internal and/or external light sources. The charged battery 303 can then be used to provide the standby power to the standby power components.

Figure 4:
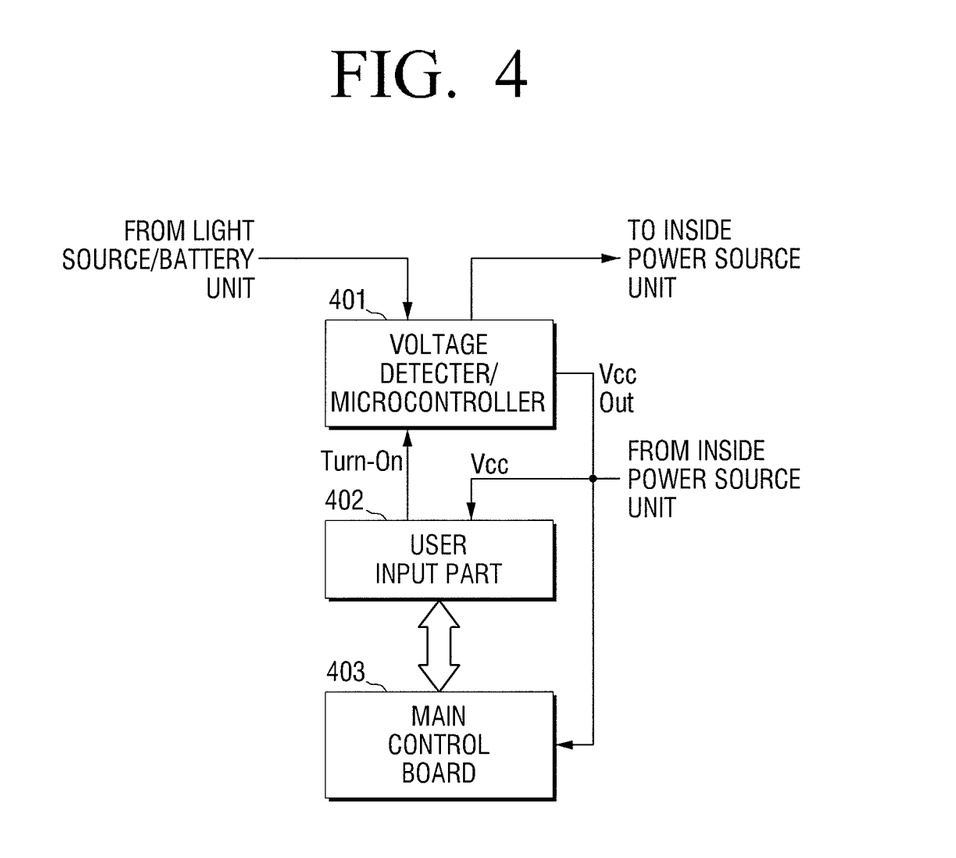
FIG. 4 illustrates an example of an apparatus according to an exemplary embodiment of the present invention.

FIG. 4 shows an example of a voltage detector/microcontroller 401, and standby components 402 and 403. In this example, the standby components include a user input part 402 and a main control board 404. The user input part 402 may include a remote sensor (not shown) used to receive commands from a user (e.g., a power on command) via a remote control, and a function key pad (not shown), which could be located on the visual display device itself and could be used to receive commands from a user. In this example, the main control board 403 receives standby power since it must be able to process the input commands received by the user input part 402, and then control the visual display device so as to comply with the received command(s) (e.g., to power on the visual display device). Also, in this example, in the event a user operates the user input part 402 (e.g., by turning pressing a power on button), the user input part 402 would then output a "Turn_On" signal to the voltage detector/microcontroller 401 so that the voltage detector/microcontroller 401 would know that the visual display device should change operating modes (e.g., from a standby mode to a normal operating mode).

As shown in FIG. 4, the voltage detector/microcontroller 401 receives a voltage from the light power source/battery unit. The voltage detector/microcontroller 401 can then determine whether the battery is charged and has a voltage level of at least a predetermined amount. The voltage detector/microcontroller 401 can then output the voltage Vcc so as to provide the standby power to the standby components 402 and 403.

Also, the voltage detector/microcontroller 401 can send a switching signal to the inside power source unit to control the operation of the inside power source unit. For example, if the voltage detector/microcontroller 401 determines that the battery is charged and has a voltage level of at least a predetermined amount, the voltage detector/microcontroller 401 can send an "OFF" control signal to the inside power source unit to prevent it from supplying the standby power to the standby components 402 and 403.

On the other hand, if the voltage detector/microcontroller 401 determines that the battery is not charged (i.e., does not have a voltage level of at least the predetermined amount), the voltage detector/microcontroller 401 can send an "ON" control signal to the inside power source unit so as to force it to begin supplying the standby power (also shown as "Vcc" in FIG. 4) to the standby components 402 and 403.

As noted above, the inside power source unit can include an AC power source (not shown). Since the voltage detector/microcontroller 401 can operate to switch the AC power source on and off depending on the detected voltage level of the battery in the light power source/battery unit, the visual display device might avoid using AC power for powering the standby components while the battery maintains a predetermined voltage level.

Figure 5:
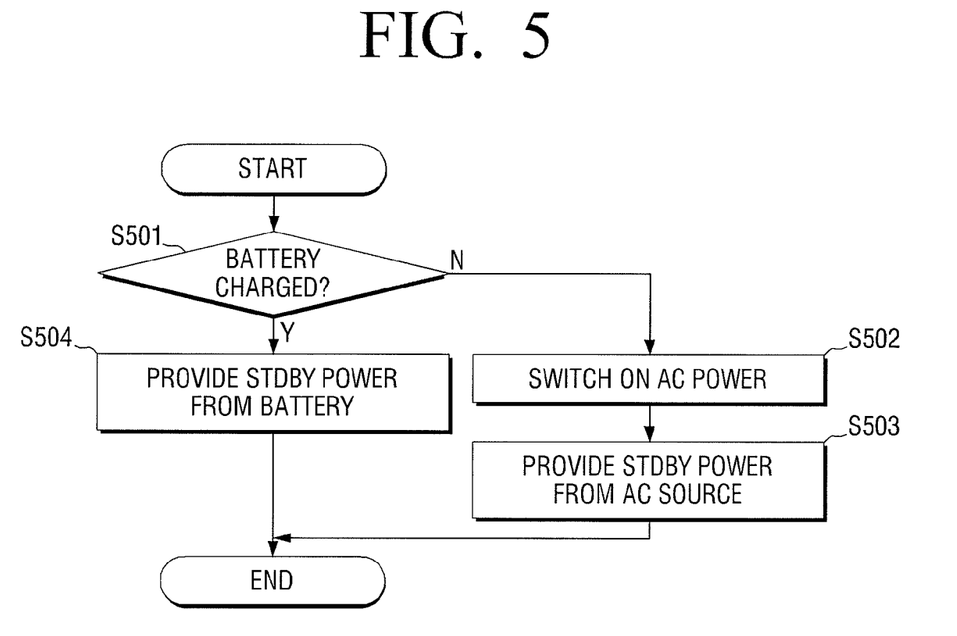
FIG. 5 illustrates an example of an operation according to exemplary embodiment of the present invention.

FIG. 5 shows an operation of providing standby power according to an exemplary embodiment of the present invention. As shown in FIG. 5, a determination is made in operation S501 as to whether the battery is charged (i.e., has a voltage level greater than or equal to a predetermined amount). If the battery is charged (S501-Y), standby power is provided from the battery (S504). On the other hand, if the battery is not charged (S501-N), the AC power source is switched on (S502), and standby power is provided from the AC power source(S503).

Figure 6:
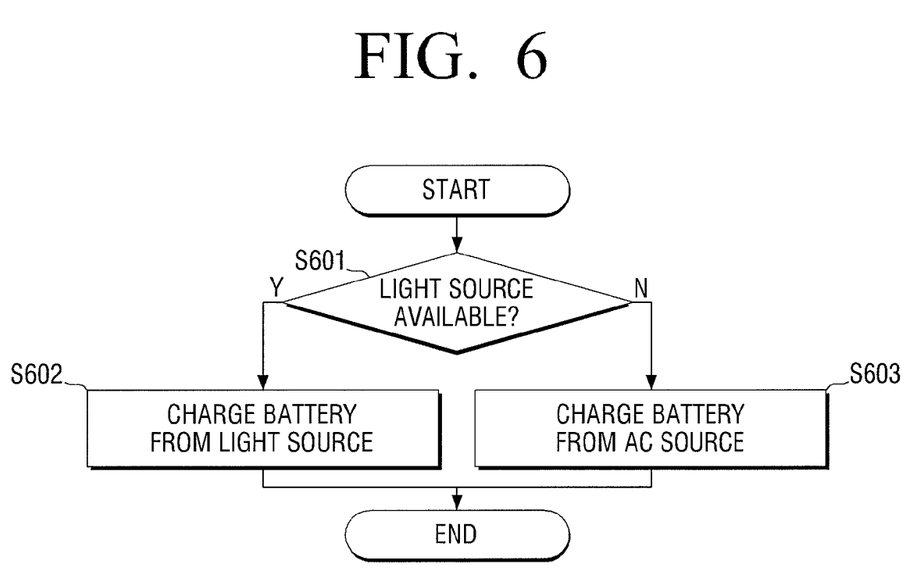
FIG. 6 illustrates an example of an operation according to exemplary embodiment of the present invention.

FIG. 6 shows an operation of charging a battery according to an exemplary embodiment of the present invention. As shown in FIG. 6, in operation S601 a determination is made as to whether a light power source is available. If the light power source is available (S601-Y), the battery is charged from the light power source in operation S602. Otherwise, the battery is charged from the AC power source (S603).

Figure 7:
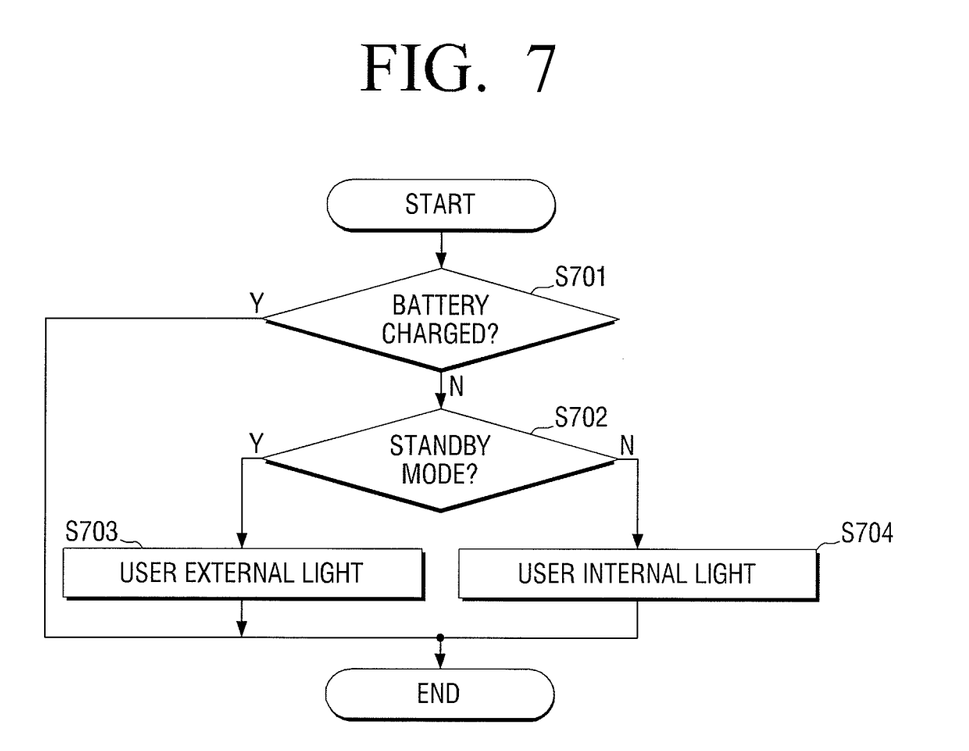
FIG. 7 illustrates an example of an operation according to exemplary embodiment of the present invention.

FIG. 7 shows an operation of charging a battery using an internal or an external light source according to an exemplary embodiment of the present invention. As shown in FIG. 7, in operation S701 a determination is made as to whether the battery is charged. If the battery is charged (S701-Y), the operation ends. Otherwise, the operation proceeds (S701-N) and a determination is made as to whether the visual display device is currently in a standby mode (S702). If the visual display device is currently in the standby mode (S702-Y), light from an external light source is used to charge the battery (S703).

On the other hand, if the visual display device is not currently in a standby mode (S702-N) (e.g., the visual display device is being used in a normal operating mode), light from an internal light source is used to charge the battery (S704). As noted above, an internal light collector can be installed within the visual display device so as to collect backlight, or any light which is not otherwise reflected toward the viewer. Thus, internal light can be used to charge the battery while user uses the visual display device in a normal operating mode.

Figure 8:
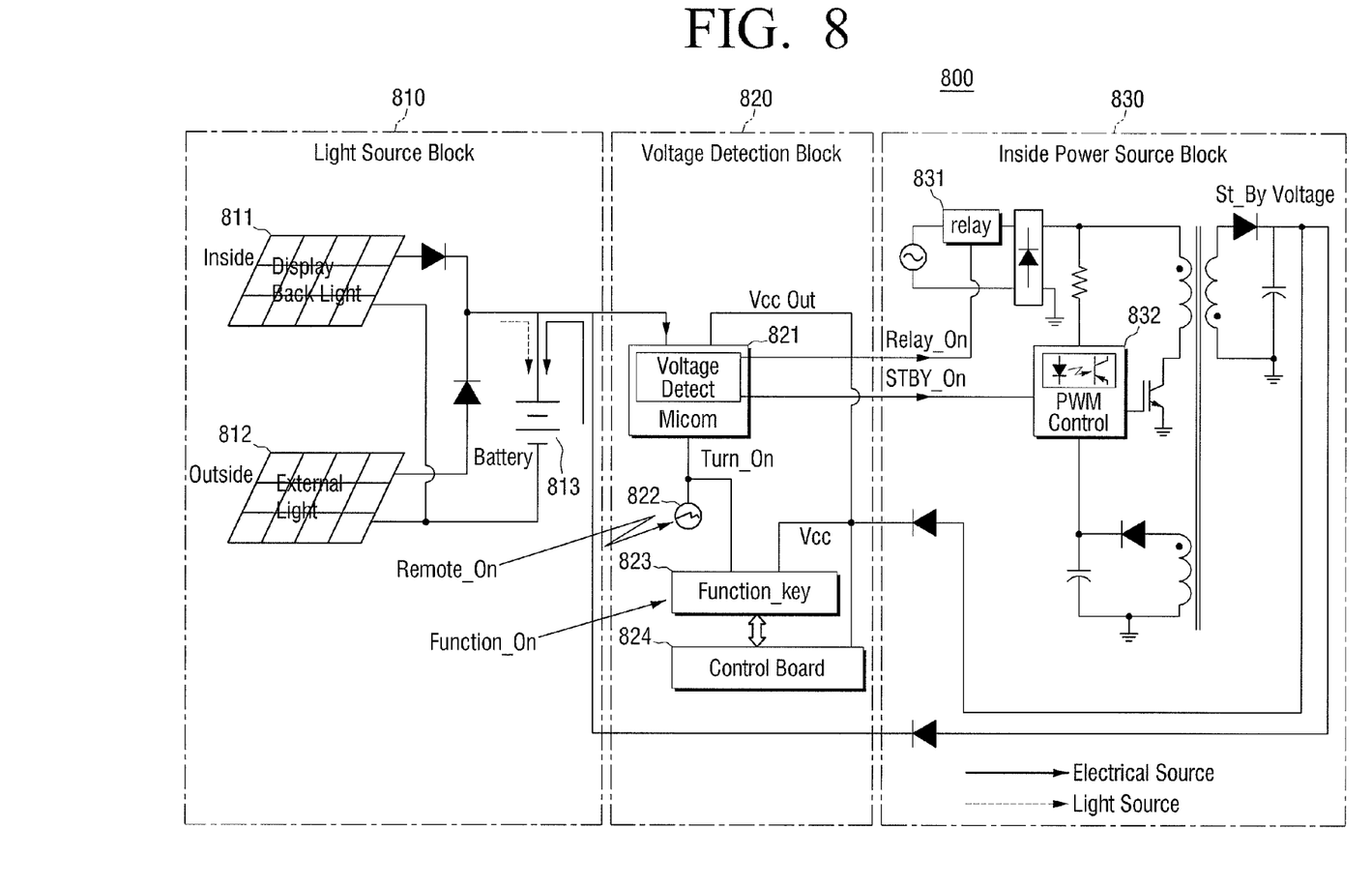
FIG. 8 illustrates an example of an apparatus according to an exemplary embodiment of the present invention.

FIG. 8 shows a detailed example of an apparatus according to an exemplary embodiment of the present invention. As shown in FIG. 8, the apparatus 800 includes a light power source block 810, a voltage detection block 820 and an inside power source block 830. In this example, the light power source block has both an inside light power source 811, which collects light from the visual display's backlight, and an outside light power source 812, which collects light from any external light sources. The internal and external light power sources are interconnected so that both are capable of charging the battery 813 (dashed arrow pointing toward battery).

The voltage detection block 820 includes the voltage detector/microcontroller 821, a remote sensor 822, a function keypad 823 and a main control board 824. The voltage detector/microcontroller 821 is connected to the battery 813 so as to be able to detect the voltage level of the battery 813. If the voltage detector/microcontroller 821 determines that the voltage level of the battery 813 is above a predetermined level, the voltage detector/microcontroller 821 outputs "Vcc Out," based on the available voltage of the battery 813, which provides the standby power to the remote sensor 822, the function keypad 823 and the main control board 824. The voltage detector/microcontroller 821 also outputs a low signal for both "Relay_On" and "STBY_ON" so that the inside power source block 830 is inactive.

On the other hand, if the voltage detector/microcontroller 821 determines that the voltage level of the battery 813 is below the predetermined level, the voltage detector/microcontroller 821 outputs a high signal for both "Relay_On" and "STBY_ON" so that the inside power source block 830 is effectively switched on (via operation of the relay and supplies standby power "St_By Voltage" to the remote sensor 822, the function keypad 823 and the main control board 824 (shown as "Vcc")). Additionally, "St_By Voltage" is also connected to the battery 813 so as to provide a charge to the battery (shown as a solid arrow pointing into the battery). It should be noted that the battery 813 may receive a charge from both the inside power source block 830 and the light power source block 810.

In the example of FIG. 8, the remote sensor 822 is operable to receive an input command "Remote_On" from a remote control. Similarly, function keypad 823 is operable to receive an input command "Function_On" from the keypad (e.g., a user presses the power on button on the visual display device).

Also, in the example of FIG. 8, the output of the function keypad 823 is connected to the remote sensor 822 such that the function keypad 823 provides the standby power to the remote sensor 822.

In this example, the main control board 824 is used to control the operation of the visual display device. For example, if the user turns the visual display device off, the OFF command could be entered via the keypad or the remote control, whereupon the main control board 824 would turn off the visual display, so as to be in a standby mode. Likewise, if the user turns the visual display device on, the ON command could be entered via the keypad or the remote control, whereupon the main control board 824 would turn the visual display on, so as to be in a normal operating mode.

Further, the output of the function keypad 823 is also connected to the voltage detector/microcontroller 821 such that if a user sends the Remote_On signal or the Function_On signal, the function keypad 823 provides an output signal whereby the voltage detector/microcontroller 821 receives the "Turn_On" signal which, in turn, results in the visual display device changing from a standby mode to a normal operating mode (e.g., by outputting the Relay_On signal as high and the STBY_On signal as low from the voltage detector/microcontroller 821).

The inside power source block 830 of FIG. 8 includes a relay controller AC power source 831 and a pulse width modulation (PWM)-controlled transformer circuit 832. During standby mode operation, if the voltage detector/microcontroller 821 determines that the battery 813 has a voltage less than a predetermined level, the voltage detector/microcontroller 821 outputs a Relay_On signal high causing the AC power source to become active, and a STBY_On signal high which causes the PWM-controlled transformer circuit 832 to output the St_By Voltage (Vcc) which is used to both provide standby power to the remote sensor 822, function keypad 823 and the main control board 824, as well as provide a charging voltage to the battery 813. However, if a user inputs the Remote_On command or the Function_On command, the voltage detector/microcontroller 821 outputs the Relay_On signal high causing the AC power source to become active (e.g., so as to provide AC power to the visual display device during normal mode operation), and outputs the STBY_On signal low, which causes the PWM-controlled transformer circuit 832 to become inactive.

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing standby power to a visual display, the method comprising:
   charging a battery with a charging current from a light collection unit collecting light of backlight of a display apparatus;
   determining whether the battery has a voltage below than a predetermined value; and
   if it is determined that the voltage is below a predetermined value, supplying the standby power to standby components from an alternating current (AC) power source and charging the battery with a charging current from the alternating current (AC) power source, wherein the charging comprises charging the battery with the current from the light collection unit if the display apparatus is not in a standby mode.

2. The method according to claim 1, wherein the light collection unit includes a first light collector circuit and a second light collector circuit.

3. The method according to claim 2, wherein the charging current includes one of a first current from the first light collector circuit and a second current from the second light collector circuit.

4. The method according to claim 3, wherein the first light collector circuit is external to the visual display and the second light collector circuit is internal to the visual display,
wherein the first light collector circuit is operable to collect first light, which is external to the visual display, and output the first current, and
wherein the second light collector circuit is operable to collect second light, which is internal to the visual display, and output the second current.

5. The method according to claim 3, wherein the battery is operable to selectively receiving one of the charging current and a third current from an alternating current (AC) power source.

6. The method according to claim 5, wherein the method further comprises: if both the first current and the second current are below a threshold value, and the voltage is below the predetermined value, charging the battery with the third current from the AC power source.

7. The method according to claim 3, wherein the method further comprises: if both the first current and the second current are below a threshold value, and the voltage is below the predetermined value, charging the battery with a third current from an alternating current (AC) power source.

8. The method according to claim 3, wherein the method further comprises: if both the first current and the second current are below a threshold value, and the voltage is below the predetermined value, providing the standby power to the visual display with an alternating current (AC) power source.

9. An apparatus for providing standby power to a visual display, the apparatus comprising:
a light collection unit which is operable to receive light and output a charging current;
a battery which is operable to receive the charging current and providing the standby power to the visual display, wherein the battery is charged with a charging current from the light collection unit collecting light of backlight of a display apparatus, if the display apparatus is not in a standby mode; and
a controller which determines whether the battery has a voltage below than a predetermined value, wherein if the controller determines that the voltage is below the predetermined value, the controller controls an alternating current (AC) power source to output the standby power to standby components in the visual display and controls the battery to receive the charging current from the alternating current (AC) power source.

10. The apparatus according to claim 9, wherein the light collection unit includes a first light collector circuit and a second light collector circuit.

11. The apparatus according to claim 10, wherein the charging current includes one of a first current from the first light collector circuit and a second current from the second light collector circuit.

12. The apparatus according to claim 11, wherein the first light collector circuit is external to the visual display and the second light collector circuit is internal to the visual display,
wherein the first light collector circuit is operable to collect first light, which is external to the visual display, and output the first current, and
wherein the second light collector circuit is operable to collect second light, which is internal to the visual display, and output the second current.

13. The apparatus according to claim 11, wherein the battery is operable to selectivity receiving one of the charging current and third current from an alternating current (AC) power source.

14. The apparatus according to claim 13, wherein if both the first current and the second current are below a threshold value, and the voltage is below the predetermined value, the controller controls the battery to receive the third current from the AC power source.

15. The apparatus according to claim 11, the apparatus further comprising an alternating current (AC) power source which outputs a third current, wherein if both the first current and the second current are below a threshold value, and the voltage is below the predetermined value, the controller controls the battery to receive the third current from the AC power source.

16. The apparatus according to claim 11, the apparatus further comprising an alternating current (AC) power source, wherein if both the first current and the second current are below a threshold value, and the voltage is below the predetermined value, the controller controls the AC power source to provide the standby power to the visual display.

17. A visual display device comprising:
a light collection unit which is operable to receive light and output a first charging current;
an alternating current (AC) power source which is operable to output a second charging current;
a battery which is operable to selectively receive one of the first charging current and the second charging current, and is operable to provide a standby power to the visual display device, wherein the battery is charged with a charging current from the light collection unit collecting light of backlight of a display apparatus, if the display apparatus is not in a standby mode; and
a controller which determines whether the battery has a voltage below than a predetermined value,
wherein if the controller determines the voltage is below the predetermined value, the controller supplies the standby power to standby components from the alternating current (AC) power source and charges the battery with a charging current from the alternating current (AC) power source.

18. The visual display device according to claim 17, further comprising:
a keypad which is operable to receive a keypad input command; and
a remote control receiving unit which is operable to receive a remote control input command,
wherein the providing of the standby power to the visual display device includes providing an operating power to at least one of the keypad and the remote control receiving unit.

19. The visual display device according to claim 17, wherein the controller further determines whether the light is received by the light collection unit, and if the voltage is below the predetermined value and the light is not received by the light collection unit, the controller controls the AC power source to provide the standby power to the visual display device.

20. The visual display device according to claim 17, wherein the controller further determines whether the light is received by the light collection unit, and if the voltage is below the predetermined value and the light is not received by the light collection unit, the controller controls the battery to selectively receive the second charging current from the AC power source.

21. The visual display device according to claim 17, wherein if the voltage is not below the predetermined value, the controller controls the battery to provide the standby power to the visual display.

* * * * *